(12) United States Patent
Gaskin

(10) Patent No.: US 9,821,766 B2
(45) Date of Patent: Nov. 21, 2017

(54) SYSTEM AND METHOD FOR ANTI-THEFT AND TRACKING OF AN AUTOMOBILE AND AUTOMOBILE WHEELS

(71) Applicant: Terrence Gaskin, Indian Head, MD (US)

(72) Inventor: Terrence Gaskin, Indian Head, MD (US)

( * ) Notice: Subject to any disclaimer, the term of this patent is extended or adjusted under 35 U.S.C. 154(b) by 0 days.

(21) Appl. No.: 14/835,737

(22) Filed: Aug. 26, 2015

(65) Prior Publication Data

US 2017/0057461 A1  Mar. 2, 2017

(51) Int. Cl.
| | |
|---|---|
| *B60R 25/10* | (2013.01) |
| *B60R 25/102* | (2013.01) |
| *B60C 23/04* | (2006.01) |
| *B60C 23/20* | (2006.01) |
| *G01S 19/16* | (2010.01) |
| *G08B 23/00* | (2006.01) |

(52) U.S. Cl.
CPC ...... *B60R 25/1001* (2013.01); *B60C 23/0408* (2013.01); *B60C 23/20* (2013.01); *B60R 25/102* (2013.01); *G01S 19/16* (2013.01); *G08B 23/00* (2013.01)

(58) Field of Classification Search
CPC ............ B60C 23/0408; B60C 23/0418; B60C 23/0437; B60C 23/0479; B60R 25/1004; B60R 25/102; B60R 25/34; B60R 25/1001
USPC ............... 340/426.19, 426.18, 442, 445, 447
See application file for complete search history.

(56) References Cited

U.S. PATENT DOCUMENTS

| | | | | |
|---|---|---|---|---|
| 6,828,905 | B2 * | 12/2004 | Normann ............ | B60C 23/0408 340/442 |
| 7,688,184 | B2 * | 3/2010 | Shimomura ........ | B60C 23/0408 340/426.33 |
| 2012/0126967 | A1 * | 5/2012 | McCormick ........ | B60C 23/0408 340/445 |
| 2015/0314752 | A1 * | 11/2015 | Shigetomi ........... | B60C 23/0437 340/426.18 |

\* cited by examiner

*Primary Examiner* — John A Tweel, Jr.

(57) ABSTRACT

The present invention provides a system and method for anti-theft and tracking of automobile and automobile wheels. The system comprises of an alert and tracking device (105) installed on the inside of an air stem of a wheel along with tire pressure monitor system (TPMS), wherein the alert and tracking device (105) detects and alerts of theft when there is an unauthorized movement such as lifting, tampering, removal of the wheel and also tracks and monitors the position of the stolen wheel. The system further comprises of a remote tracking application (111) to control and track the stolen wheel from the remote location.

8 Claims, 6 Drawing Sheets

SYSTEM AND METHOD FOR ANTI-THEFT AND TRACKING OF AN AUTOMOBILE AND AUTOMOBILE WHEELS

CROSS REFERENCE TO RELATED APPLICATIONS

This application claims the benefit of U.S. Provisional Application No. 62/064,489 filed with USPTO on 16 Oct. 2014 entitled "System and method for anti-theft and tracking of an automobile and automobile wheels".

TECHNICAL FIELD OF THE INVENTION

The present invention relates to a security and theft alarm systems for automobiles. More particularly, the present invention relates to the system and method for automobile and automobile wheels anti-theft and tracking.

BACKGROUND OF THE INVENTION

In existing systems, stolen vehicles can be tracked and recovered by placing a tracking device inside the vehicle but these conventional systems do not provide any such system for tracking and recovery of stolen parts of a vehicle. Almost all parts of an automobile are quite expensive and have no security measures/features against theft. Also, the customized automobile parts are not insured against theft. One such customized part is the vehicle's wheel, which is very expensive. Normally, many SUV (Sports Utility Vehicle), truck or any automobile buyers replace factory wheels with custom wheels. Custom wheel aftermarket is one of the fastest growing segments in automobile industry. Since these custom wheels are quite expensive ($2000-$20000 per set), they are easy targets for theft. In such cases, mechanical protection or even wired electronic protections fails, because of the sophisticated means employed by vehicle thieves. Custom wheels are not covered under general insurance and also the expense of replacing factory wheels is high and at the very least a deductible payment.

The existing prior arts comprise a system which tracks the stolen wheels and sends the signal to the owner of the vehicle. The authentication process and data transmission process involved in the prior art is not secured. Also in the conventional systems, the devices used to transmit and receive the signal are not effective, which leads to reduced efficiency of the whole system.

The U.S. patent Ser. No. 12/954,322, titled "Method of detecting a vehicle tire theft", discloses about a system and method for detecting a missing vehicle tire and notifying a user of the vehicle about a potential vehicle tire theft. The method carried out by the system involves detecting that a tire is missing from a vehicle using a vehicle tire pressure monitoring (TPM) system and thereafter providing a notification of the missing tire via a wireless communication sent from a telematics unit on the vehicle. However, the secured data transmission is required as valid identification number for each sensor is used as an indicator of a missing tire in the existing art. Further, this prior art discusses about the navigation system and a program to run vehicle system and subsystem diagnostic tests. Based on the speed of the vehicle, ignition status and the movement of the wheels, the vehicle tire theft is detected.

The Chinese patent number 203472438, titled "Tire pressure alarming monitoring system with low-frequency trigger", discloses the tire pressure alarming monitoring system comprising a tire pressure alarming controller, a tire pressure alarming emitter and a tire pressure alarming receiver. The system includes low-frequency trigger, information sending equipment, information receiving equipment and instruction sending equipment. The information receiving equipment and the instruction sending equipment are connected with the tire pressure alarming controller through the Bluetooth module. According to the tire pressure alarming monitoring system with the low-frequency trigger, a user can switch ON or switch OFF the monitoring system with the instruction sending equipment according to a requirement. The system disclosed in this prior art is used for tire pressure warning system and improving the safety of driving, but it fails to send the alarm to one or more authorized persons during theft or tampering of the vehicles or may be parts of the vehicle.

The Chinese patent number 201998943, titled "Automobile anti-theft device based on GPS", discloses an automobile anti-theft device based on GPS (global positioning system), which comprises an automobile condition detecting module, a communication module connected with the automobile condition detecting module, an anti-theft controller connected with the communication module and an automobile condition detecting module. The communication module and anti-theft controller are arranged in an engine cover, and the automobile anti-theft device and a GPS navigation system are connected with an automobile relay controller used for locking an engine. In this prior art, the ignition of the vehicle is locked to ensure the security of the vehicle. Also, this system cannot be installed on the existing systems and requires the development of device, which involves high cost. However, this system is restricted to an automobile anti-theft device but not for the parts of the automobile.

The Japanese patent number 2008012977, titled "Tire/Wheel Theft Detecting Device". The acceleration information from the detecting unit is received by a monitoring unit. The change pattern of the received acceleration in a predetermined time and a change pattern stored in advance in the monitoring unit are compared, and a theft alarm is raised when the change pattern is out of a permissible range. The theft alarm in this prior art is raised based on the acceleration behavior of the automobile.

Hence, looking at the problems in the prior art, there is a need for an anti-theft and tracking device for automobile and automobile wheels, which is configured to track and send alerts to the owner of the automobile during the theft. Moreover, the system must also provide secured authentication and data transmission process.

SUMMARY OF THE INVENTION

The present invention overcomes the drawbacks in the prior art and provides a system and method for anti-theft and tracking of an automobile and automobile wheels. The system comprises of an alert and tracking device installed inside the air stem of an automobile wheel along with tyre pressure monitor system (TPMS), wherein the alert and tracking device detects theft and alerts of theft when there is an unauthorized movement such as lifting, tampering or removal of the wheel using proximity sensors and, tracks and monitors the position of the stolen wheel. The system further comprises of a means to control and track the stolen wheel from remote places.

In a preferred embodiment of the invention, the means to control and track the stolen wheel from remote places refers to a remote tracking application installed on at least one computing device such as a desktop, a laptop, cell phone, PDA, tablet etc. running on a plurality of operating systems such as Windows, Android, iOS, etc. to control and track the automobile wheel during theft. The alert and tracking device stores a unique identifying code for authenticating the owner of the automobile with device, wherein the owner of the automobile can access the mobile tracking application using the unique identifying code, so that no one can tamper with the remote tracking application apart from an authorized user.

According to another embodiment of the invention, the system is further configured such that the alert and tracking device sends the location of the stolen wheel continuously to the remote tracking application using GPS (Global Positioning System) and also sends an SMS (Short Message Service) to a predefined number such as local police station number and an alarm notification to the remote tracking application.

Hence, the present invention provides a system, which is cost effective and easy to install. In the present invention, removing the device takes at least 10-15 minutes, including the time required to completely deflate the wheel and take the device out of the wheel and physically destroy it, which gives sufficient time to the system to activate the alarm and alert the owner about the theft. The present invention also provides a secured authentication and data transmission, which in return increases the safety and efficiency of the entire system.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each embodiment is provided to explain the subject matter and not a limitation. These embodiments are described in sufficient detail to enable a person skilled in the art to practice the invention, and it is to be understood that other embodiments may be utilized and that logical, physical, and other changes may be made within the scope of the embodiments. The following detailed description is, therefore, not be taken as limiting the scope of the invention, but instead the invention is to be defined by the appended claims.

The present invention overcomes the drawbacks in the prior art and provides a system and method for anti-theft and tracking of an automobile and automobile wheels. The system comprises of an alert and tracking device installed inside the air stem of an automobile wheels along with tyre pressure monitor system (TPMS), wherein the hardware device detects and alerts of theft whenever there is an unauthorized movement such as, lifting, tampering or removal of the wheel using proximity sensors and, tracks and monitors the position of the stolen wheel. The system further comprises of a means to control and track the stolen wheel from remote places.

Figure 1:
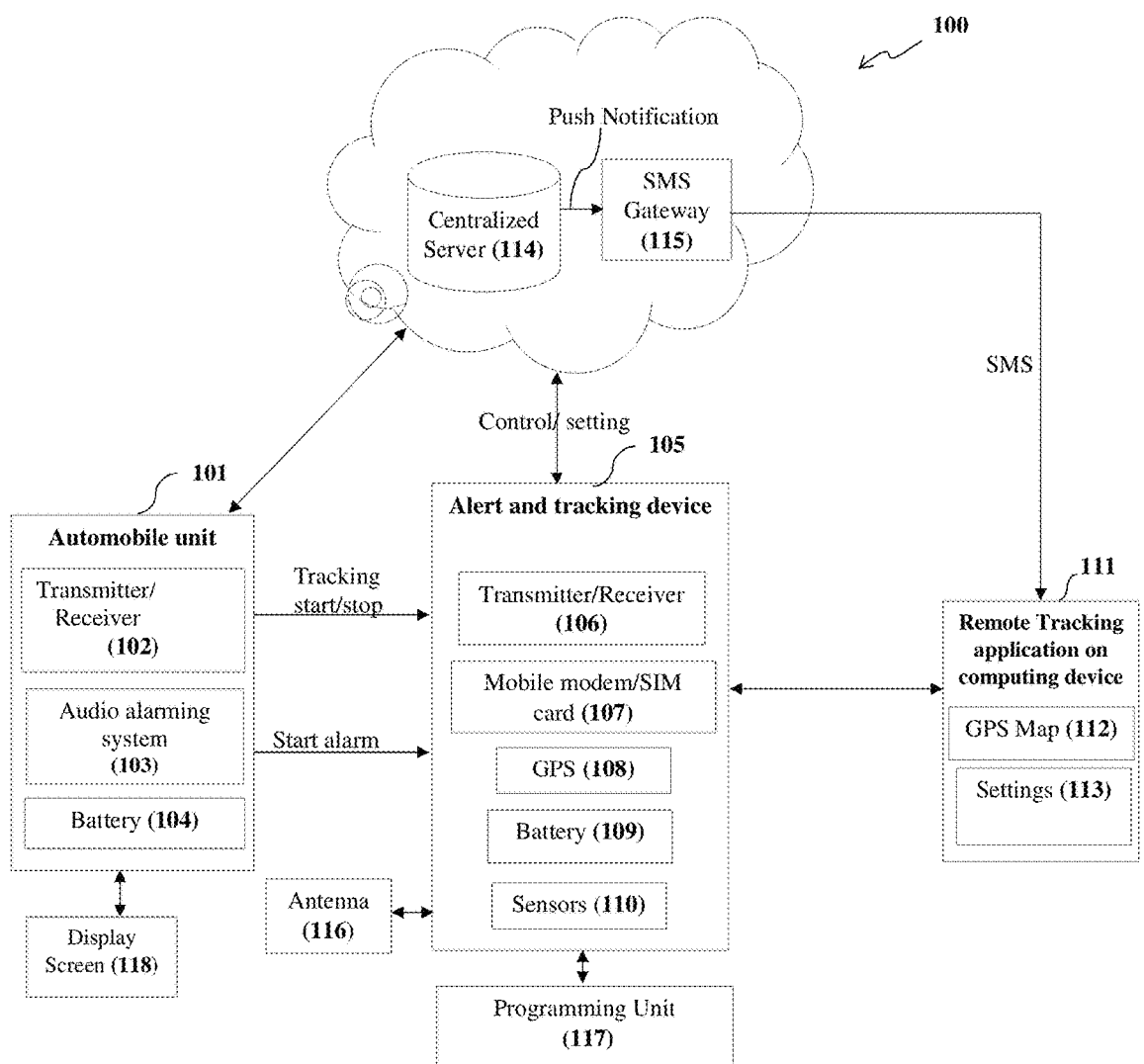
FIG. 1(a) and FIG. 1(b) illustrate a block diagram of the automobile wheel anti-theft and tracking system, according to one embodiment of the invention.
Figure 1:
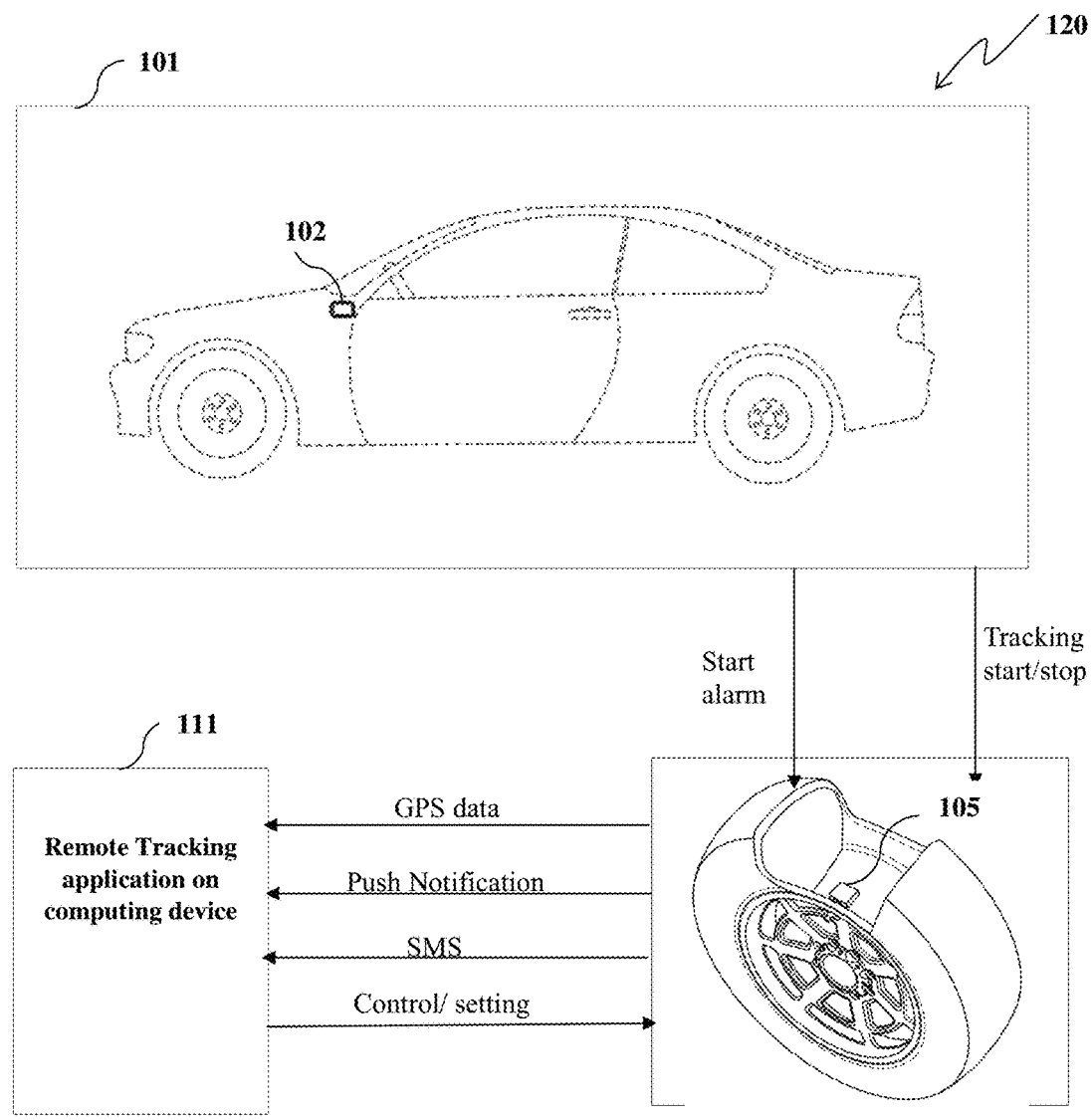

FIG. 1(a) and FIG. 1(b) illustrate a block diagram of the automobile wheel anti-theft and tracking system, according to one embodiment of the invention. The system comprises an alert and tracking device (105) installed inside the air stem of a wheels along with tyre pressure monitor system. The alert and tracking (105) comprises of a receiver/transmitter (106), a mobile modem or SIM (Subscriber Identification Module) card (107), a Global Positioning System (GPS) tracker (108), plurality of batteries (109) to power ON the alert and tracking device (105), a plurality of sensors (110) such as pressure sensor, acceleration sensor, temperature sensor and proximity sensor. The alert and tracking device (105) detects the unauthorized movements such as lifting, tampering, removal of the wheel and sends the lifting/tampering alarm to the automobile unit (101) until the link with automobile unit (101) is active. When the alert and tracking device (105) is moved away from automobile unit (101), the alert and tracking device (105) detects it using proximity sensors and sends the proximity alarm to the remote tracking application (111). In such case, alert and tracking device (105) sends the SMS alarm to the registered mobile numbers. The automobile unit (101) is placed inside the automobile. The automobile unit (101) produces high audible alarm using audio alarming system (103), when the signal from alert and tracking device (105) is received.

The automobile unit (101) may be operated by a battery (104). The battery used in the automobile unit (101) is a rechargeable battery. The audio alarm system (103) may be controlled by the owner of the automobile through a remote control system.

The GPS tracker (108) in the alert and tracking device (105) locates the position of the stolen wheel continuously and transmits the location to the remote tracking application (111) as a push notification. In a preferred embodiment, the remote tracking application (111) may be installed in a computing device. The computing device may be any device such as a desktop, a laptop, cell phone, PDA, tablet running plurality of operating systems such as android, iOS, etc.

The remote tracking application (111) receives the GPS data of the stolen wheel from the alert and tracking device (105) in the form of push notification and notifies the owner of the automobile with the location of the alert and tracking device (105) during theft through GPS map (112), the exact identity of the wheel (front-right, back-left etc.) and the time. Every alert and tracking device (105) has its own unique identifying code for registering the owner of the automobile with the device. The device is tethered to the remote tracking application (111) using unique identifying code, wherein the unique identifying code is given to the owner of the automobile to access the remote tracking application (111), so that no one can tamper with the remote tracking application (111).

The GPS data may also be sent as a short message service (SMS) by using a SIM card (107) inserted inside the alert and tracking device (105) to predefined numbers such as local police station number which are defined in the setting (113) provided in the remote tracking application (111).

The transmitter/receiver (106) is any type of transmitter/receiver unit known in the art or future-developed for transmitting/receiving signal. As an example, transmitter/receiver may be a low-energy Bluetooth, a Near Filed Communication (NFC), a Radio Frequency (RF) transmitter/receiver or a wireless.

Figure 2:
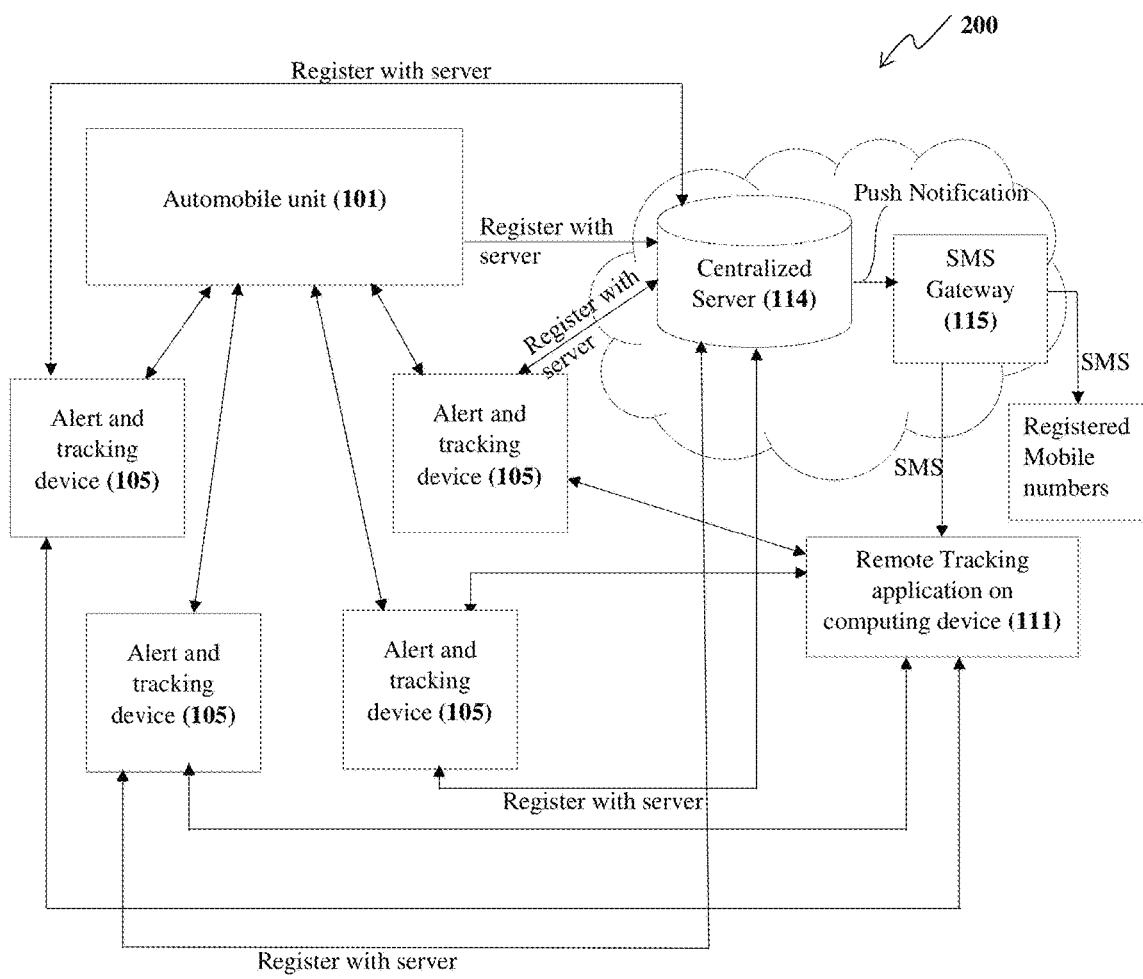
FIG. 2 illustrates a block diagram of the automobile wheel anti-theft and tracking system and data flow between the different modules, according to one embodiment of the invention.

FIG. 2 illustrates a block diagram of the automobile wheel anti-theft and tracking system and data flow between the different modules, according to one embodiment of the invention. In one of the embodiments of the present invention, an automobile unit (101) is configured with one or more alert and tracking devices (105), wherein the automobile unit (101) and the associated alert and tracking devices (105) are flashed with the unique IDs. The alert and tracking devices (105) and automobile unit (101) are configured with proper parameters such as temperature, pressure, acceleration etc. The one or more alert and tracking devices (105) and an automobile unit (101) are packaged with a unique code.

The remote tracking application (111) is downloaded and installed on to the computing device by providing the mobile number and user details. The vehicle details such as owner name, VIN number etc. are registered with the centralized server (114) through the installed application. The unique code from alert and tracking devices (105) and automobile unit (101) package are scanned using the remote tracking application (111) and sent to the centralized server (114). The centralized server (114) sends a registration SMS to automobile unit (101) through the SMS gateway (115) and automobile unit (101) sends back the acknowledgement SMS to centralized server (114) through SMS gateway (115).

Further, the centralized server (114) sends the confirmation SMS to remote tracking application (111). Hence the alert and tracking devices (105), automobile unit (101), remote tracking application (111), and centralized server (114) are registered with each other.

In a preferred embodiment of the present invention, the monitoring of tyre pressure comprises of two modes i.e., auto mode and on-demand mode. In the auto mode the TPMS monitors the tyre pressure continuously and sends the signal to alert and tracking devices (105) if the pressure is deflated below the threshold value. The alert and tracking device (105) sends the pressure data packet to the automobile unit (101) in ultra-high frequency, wherein the automobile unit (101) receives the pressure data and analyzes the value. The automobile unit (101) displays the visual alarm on a particular region of the screen (118) to indicate the current pressure status.

In the on-demand mode, the user selects the region on the screen to check the current pressure of a particular alert and tracking devices (105). The automobile unit (101) sends the signal to the selected alert and tracking devices (105) in low frequency, wherein alert and tracking device (105) receives the signal to measure the current pressure. The measured data is sent back to the automobile unit (101) in ultra-high frequency, wherein and the automobile unit (101) receives the measured data and displays on the screen.

In the present invention the acceleration sensor (1j) detects the unauthorized movement and sends the signal to alert and tracking devices (105), wherein the alert and tracking devices (105) sends the wheel lifting/tampering alarm to automobile unit (101). The alert and tracking device (105) is installed inside each wheel of the automobile. The automobile unit (101) checks for any similar alarms from all other alert and tracking devices (105) to rectify whether there is a movement of individual alert and tracking device (105) or the automobile movement. Upon the confirmation of the lifting/tampering by the automobile unit (101), the automobile unit (101) enables the high decibel audio alarm and sends alarm to the remote tracking application (111) with position of the wheel i.e. left front, right front, left rear or right rear. The automobile unit (101) continuously receives the alarm data from alert and tracking device (105) and sends the acknowledgement packets to alert and tracking device (105), wherein the alert and tracking device (105) uses the packets for proximity calculation. The automobile unit (101) checks the signal strength of alert and tracking device (105) using proximity sensors and enables the GPRS once the alert and tracking device (105) is moved out of automobile unit's proximity. Again the automobile unit (101) sends the alarm to remote tracking application (111) along with push notification for every 1 minute. In case of false alarm, the remote tracking application (111) sends a command to stop sending the notifications. Further, when the alert and tracking device (105) is moved out of automobile unit's proximity, the alert and tracking device (105) interacts directly with the remote tracking application (111) over SMS. The SMS is sent to the centralized server (114) for SMS gateway usage or directly sent to the remote tracking application (111) and predefined mobile numbers such as police station etc. The alert and tracking device (105) continuously sends the wheels location such as latitude, longitude and altitude to the remote tracking application (111) for every 3 minutes. It also sends the distance between the alert and tracking device (105) and automobile unit (101) continuously to remote tracking application (111), if it is less than 5 miles. In case the alarm SMS is not required by the user then the user may send the command from remote tracking application (111) to alert and tracking device (105) to stop sending the tracking alarm SMS.

In another embodiment of the present invention, the re-installing of one or more alert and tracking device (105) at the service stations during maintenance is accomplished by configuring the alert and tracking device (105) and automobile unit (101) in inactive mode. Further, detaching the wheel which is to be replaced and installing the new wheel along with new alert and tracking device, wherein the new alert and tracking device is installed inside the wheel. The automobile unit (101) is configured with new alert and tracking device using the programming unit.

The alert and tracking device (105) is switched in active or inactive mode through automobile unit (101), wherein these modes are required to stop any false alarms such as unauthorized removing or tampering of the wheel, authorized tyre, tube or rim replacement at service centers, accident condition, or road conditions like hump, sharp U-turns etc.

In the preferred embodiment of the present invention, the system ensures a secured data transmission between the plurality of modules. A program unit is used to ensure the secured data transmission. The program unit sends the low frequency signal to automobile unit (101) and the automobile unit (101) sends back the acknowledgement message to program unit, wherein the authentication between the automobile unit (101) and program unit is done before transmission of data. During the transmission of data, the program unit encrypts the data to be transferred, wherein program unit sends data to the automobile unit (101) in ultra-high frequency radio. The automobile unit (101) decrypts the received data and checks the data packet sequence number, wherein it detects the required data packets and rejects the unwanted data packets. The valid data packet is processed and the configuration data is updated in local memory data packet. The data packet comprises of start byte, sequence number, command ID, automobile unit Unique ID, alert and tracking device unique ID, centralized server detail, vehicle owner's mobile number, police station phone number, GPS tracking frequency timer, activation/deactivation flag (during reinstallation of alert and tracking device), cyclic redundancy check (CRC) and end byte.

In the preferred embodiment of the present invention, an Advanced Encryption Standard (AES) encryption and decryption module is used for the data encryption and decryption.

Figure 3:
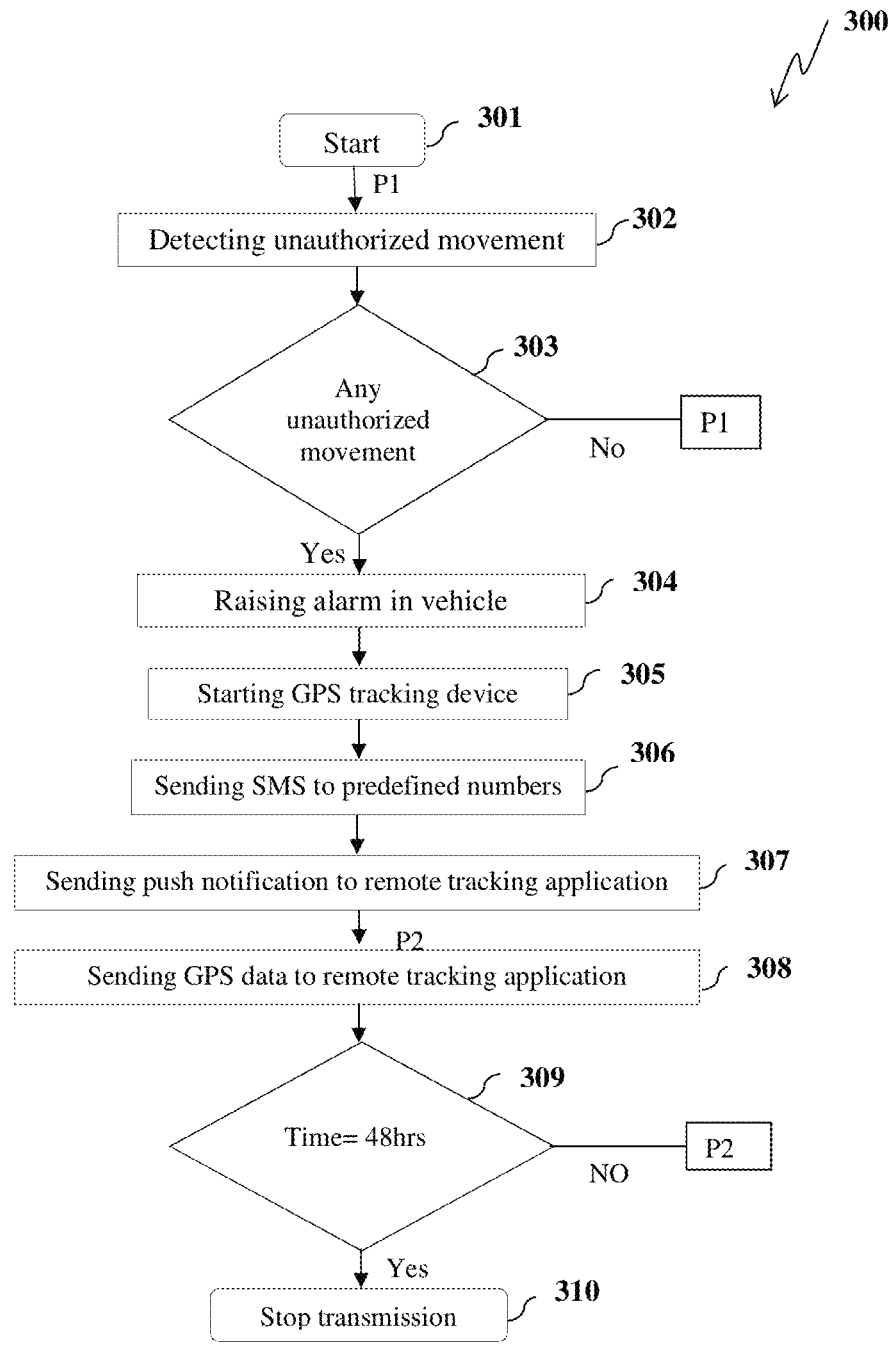
FIG. 3 illustrates process flow of the method for detecting and tracking of stolen wheel, according to one embodiment of the invention.

FIG. 3 illustrates process flow for the method of automobile wheel anti-theft and tracking, according to one embodiment of the invention. At step (302), the device detects unauthorized movement such as lifting, tampering, removal of the wheel using proximity sensors. At step (303), if any unauthorized movement condition is satisfied, then at step (304), the audio alarming system (103) placed in the automobile unit (101) produces a high audible alarm. At step (305), GPS tracker starts tracking the location of the stolen wheel.

At step (306), an SMS is sent to the predefined numbers. At step (307) and (308), a push notification and GPS data is sent to the remote tracking application (111). At step (309), a particular time is set in the tracking device using remote tracking application (111), wherein GPS data is continuously sent to the remote tracking application (111) until the set time expires. The tracking device starts up automatically after predefined time interval and starts sending the GPS data to the remote tracking application (111). The power is consumed by the tracking device only if the tracking device is in use, which reduces the power consumption and allows the device to be in use for a longer duration.

The system in the present invention may also be used in tracking automobile theft such as SUV's (Sports Utility Vehicle), MUV's (Multi Utility Vehicle), ATVs (All-Terrain Vehicle), MPV (Multi-Purpose Vehicles) boats, two-wheelers, commercial vehicles, farm equipment, industrial construction equipment, motorcycles, bicycles, 18 wheeler trucks and trailers and scooters etc.

Figure 4:
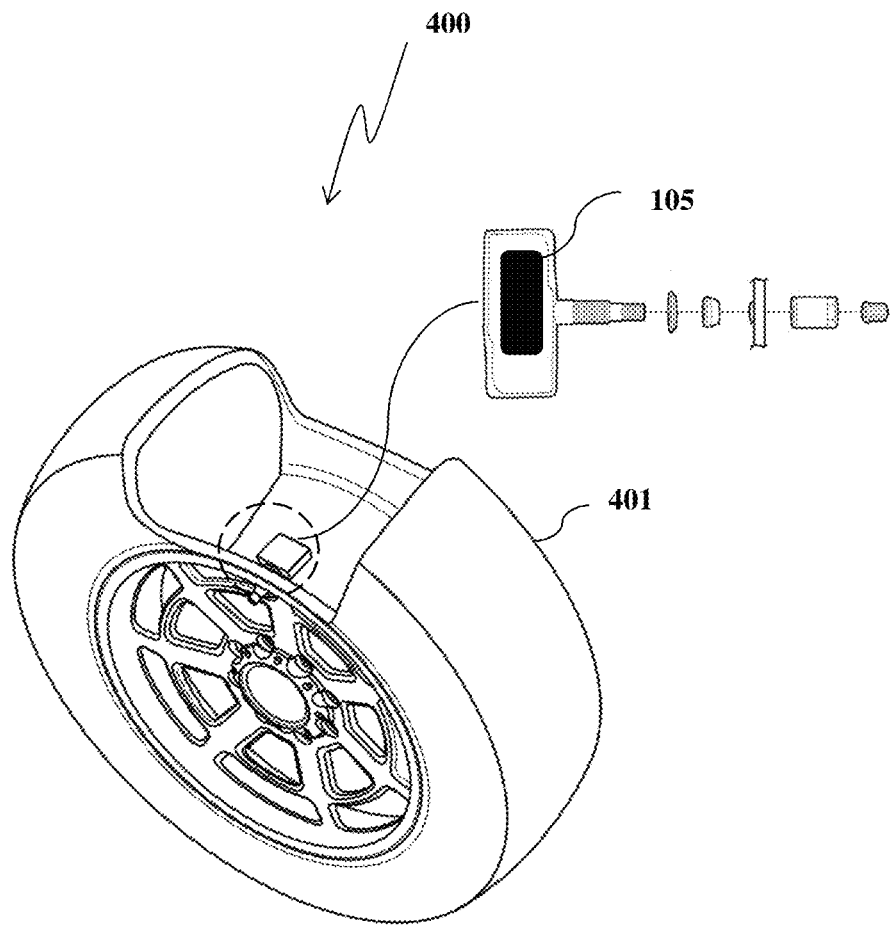
FIG. 4 illustrates the cut away view of a wheel of an automobile representing alert and tracking device placed inside the wheel, according to one embodiment of the invention.

FIG. 4 illustrates the cut away view of a wheel of an automobile representing alert and tracking device placed inside the wheel, according to one embodiment of the invention. The alert and tracking device (105) is installed inside the air stem of a wheel (401) along with tyre pressure monitor system (TPMS). The alert and tracking device (105) detects the unauthorized movements such as lifting, tampering, removal of the wheel using proximity sensors and transmits a signal through transmitter/receiver (106) to an automobile unit (101).

Figure 5:
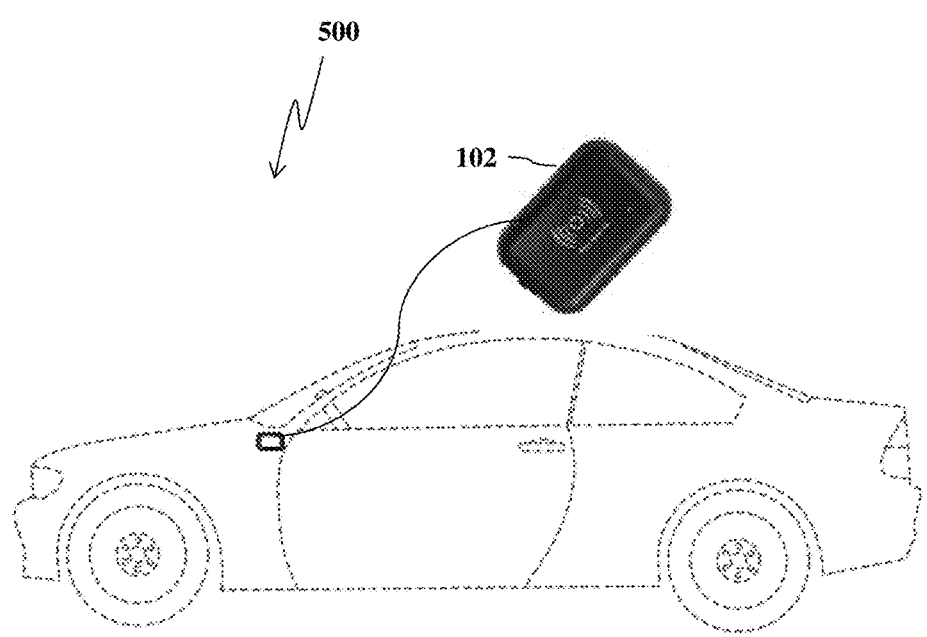
FIG. 5 illustrates the transmitter/receiver device placed inside the automobile unit according to one embodiment of the invention.

FIG. 5 illustrates the low-energy Bluetooth transmitter/receiver device placed inside the automobile unit (101), according to one embodiment of the invention. The automobile unit (101) may be placed inside the automobile wherein the signal is received from alert and tracking device (105) using a low-energy Bluetooth receiver and produces a high audible alarm using audio alarming system (103).

The present system may be powered OFF whenever it is needed to save battery level and also to avoid false alarm. The system also alerts the owner of the automobile whenever battery is low for detection and tracking, hence maintenance and safety of the system is assured.

The system is cost effective and easy to install. The removal of the device takes at least 10-15 minutes, including the time required to completely deflate the wheel and take the device out of the wheel and physically destroy it, which gives sufficient time to the system to activate the alarm and alert the owner and the local police station about the theft. The present invention also provides the secured authentication and data transmission process, which in return increases the efficiency of the entire system.

It is to be understood, however, that even though several characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

I claim:

1. A system for anti-theft and tracking of an automobile and automobile wheels, comprises of:
   a) an alert and tracking device (105) installed inside the air stem of a wheel along with tyre pressure monitor system (TPMS), wherein the alert and tracking device (105) comprises:
      receiver/transmitter (106);
      a mobile modem or subscriber identification module (SIM) card (107);
      a global positioning system (GPS) tracker (108);
      plurality of batteries (109) to power ON the alert and tracking device (105);
      a sensors (110); and
      an antenna (116),
      wherein the alert and tracking device (105) has a unique identifying code for registering the owner of the automobile with the alert and tracking device (105);
   b) an automobile unit (101) placed inside an automobile, wherein the automobile unit (101) receives a signal from the alert and tracking device (105);
   c) the remote tracking application (111) installed onto a computing device, wherein the position of stolen wheel is sent continuously to the remote tracking application (111) from the GPS tracker (108), wherein the alert and tracking device (105) is tethered to the remote tracking application (111) using unique identifying code, wherein the unique identifying code is given to the owner of the automobile to access the mobile tracking application (111);
   d) a centralized server (114) to register a vehicle identification number through the remote tracking application (111) and to store the alert and tracking device's and automobile unit's data;
   e) a programming unit (117) to configure the alert and tracking device (105) and the automobile unit (101).

2. The system as claimed in claim 1, wherein said automobile unit (101) produces a high audible alarm using audio alarming system (103).

3. The system as claimed in claim 1, wherein said computing device is a desktop, a laptop, a cell phone, a personal digital assistant (PDA), a tablet running any type of operating systems but not limited to windows, android, iPhone operating system (iOS).

4. The system as claimed in claim 1, wherein said GPS data is transferred through a short message service (SMS) to any of the predefined numbers but not limited to local police station number, by using a SIM card (107) inserted inside the alert and tracking device (105).

5. The system as claimed in claim 1, wherein said transmitter/receiver (106) is any type of transmitter/receiver unit used for transmitting/receiving signal but not limited to a low-energy Bluetooth, a Near Filed Communication (NFC), a Radio Frequency (RF) transmitter/receiver or a wireless.

6. The system as claimed in claim 1, wherein said alert and tracking device (105) sends the SMS alerts to the registered mobile numbers for every predefined time through a SMS gateway (115).

7. The system as claimed in claim 1, wherein said system also sends a TPMS data from the TPMS Unit of all the wheels of the automobile to the automobile unit (101), wherein the TPMS data contain any data related to TPMS but not limited to tyre pressure, temperature.

8. The system as claimed in claim 1, wherein said the position of stolen wheel and TPMS data is sent continuously to the remote tracking application (111) from the GPS tracker (108) over the internet.

\* \* \* \* \*